United States Patent
Mehlan et al.

(10) Patent No.: US 8,357,051 B2
(45) Date of Patent: Jan. 22, 2013

(54) TORSIONALLY ELASTIC SHAFT COUPLING COMPRISING A BRIDGEABLE ELASTOMER MEMBER

(75) Inventors: Andreas Mehlan, Unna (DE); Christof Hessling, Haltern am See (DE)

(73) Assignee: Hackforth GmbH, Herne (DE)

( * ) Notice: Subject to any disclaimer, the term of this patent is extended or adjusted under 35 U.S.C. 154(b) by 276 days.

(21) Appl. No.: 12/311,264

(22) PCT Filed: Sep. 18, 2007

(86) PCT No.: PCT/EP2007/008078
§ 371 (c)(1),
(2), (4) Date: Nov. 13, 2009

(87) PCT Pub. No.: WO2008/037371
PCT Pub. Date: Apr. 3, 2008

(65) Prior Publication Data
US 2010/0120544 A1  May 13, 2010

(30) Foreign Application Priority Data
Sep. 25, 2006 (DE) .......................... 10 2006 045 614

(51) Int. Cl.
*F16D 3/58* (2006.01)
(52) U.S. Cl. .......................................... 464/92
(58) Field of Classification Search ............. 464/87–90, 464/92, 93
See application file for complete search history.

(56) References Cited

U.S. PATENT DOCUMENTS

| | | | |
|---|---|---|---|
| 3,023,593 A | | 3/1962 | Nallinger |
| 3,245,229 A | * | 4/1966 | Fadler ............................ 464/90 |
| 3,557,573 A | * | 1/1971 | Hansgen ......................... 464/90 |
| 6,106,421 A | * | 8/2000 | Graber et al. |
| 6,234,903 B1 | | 5/2001 | Walter et al. |
| 7,204,772 B2 | | 4/2007 | Huber |

(Continued)

FOREIGN PATENT DOCUMENTS

DE  725 651  9/1942

(Continued)

OTHER PUBLICATIONS

"Outside". Dictionary.com. [online], [retreived on Jun. 3, 2012]. Retreived from the Internet <URL:http://dictionary.reference.com/browse/outside>.*

(Continued)

*Primary Examiner* — Gregory Binda
*Assistant Examiner* — Josh Skroupa
(74) *Attorney, Agent, or Firm* — Collard & Roe, P.C.

(57) ABSTRACT

A torsionally elastic shaft coupling has an input flange and an output flange which are each used for connecting the shaft coupling to adjacent machine elements. There are two serially connected, elastic elastomer members, and an intermediate member that is connected to the input flange via the first elastomer member and to the output flange via the second elastomer member in such a way that torque can be transmitted from the input flange to the intermediate member via the first, softer elastomer member and from the intermediate member to the output flange via the second, harder elastomer member. A stop which limits the torsional angle between the input flange and the intermediate member is located between the intermediate member and the input flange. The shaft coupling is designed in a particularly compact fashion in that the second, hard elastomer member surrounds the first, soft elastomer member.

3 Claims, 6 Drawing Sheets

U.S. PATENT DOCUMENTS 7,300,372 B2 * 11/2007 Riu .................. 464/90

FOREIGN PATENT DOCUMENTS

Figure 1:
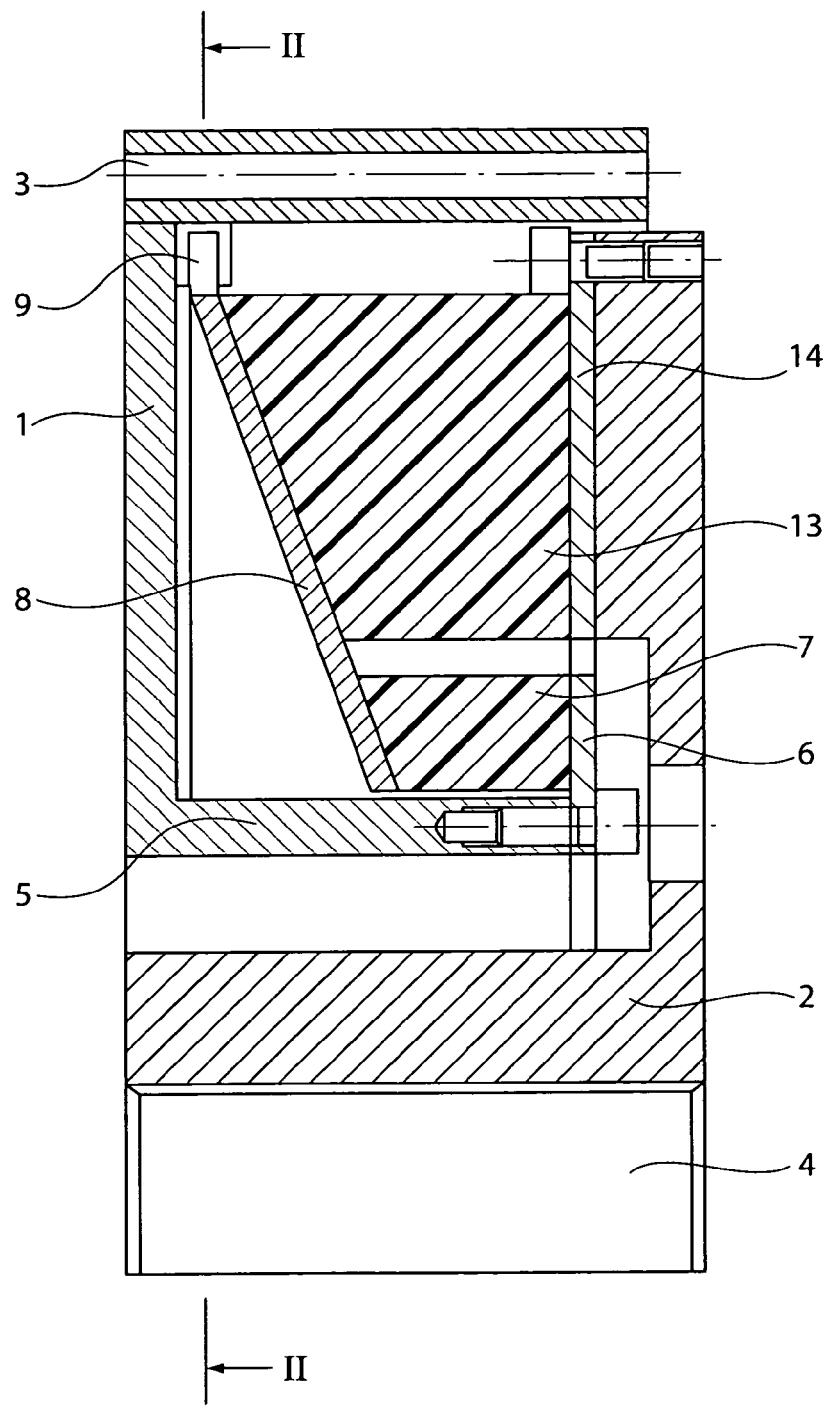

| DE | 1 167 661 | 11/1958 |
| DE | 94 01 869 | 6/1995 |
| DE | 195 37 662 | 4/1997 |
| DE | 197 03 936 | 8/1998 |
| DE | 102 11 640 | 10/2003 |
| GB | 579 226 | 7/1946 |
| GB | 613 404 | 11/1948 |
| GB | 2024368 | * 1/1980 |

OTHER PUBLICATIONS

International Search Report of PCT/EP2007/008078, Feb. 13, 2009.

* cited by examiner

TORSIONALLY ELASTIC SHAFT COUPLING COMPRISING A BRIDGEABLE ELASTOMER MEMBER

CROSS REFERENCE TO RELATED APPLICATIONS

This application is the National Stage of PCT/EP2007/008078 filed on Sep. 18, 2007, which claims priority under 35 U.S.C. §119 of German Application No. 10 2006 045 614.9 filed Sep. 25, 2006. The international application under PCT article 21(2) was not published in English.

The present invention relates to a torsionally elastic shaft coupling in accordance with the preamble of claim 1.

Such shaft couplings are known from DE 1 167 661 B.

Torsionally elastic shaft couplings are used in drive trains that transfer torque between a motor and a work machine, in order to damp torsional vibrations within the drive train. A typical application case is the drive train of a ship, between engine and propeller. Shaft couplings are flanged onto the adjacent machine elements with their drive flange or their power take-off flange, respectively, such as onto the flywheel of an engine or onto a shaft, for example. Under load, the drive flange and power take-off flange are twisted relative to one another, so that the elastomer bodies are elastically deformed. In this connection, the elastomer bodies are essentially put under stress in the shear direction.

In the case of ship drives, in particular, torsionally elastic shaft couplings that have a progressive spring characteristic line are required. This means that the torsion angle between drive flange and power take-off flange at first increases greatly with an increasing torque, but in the range of the rated torque, it only increases slightly. In the range of the rated torque, the coupling is therefore clearly stiffer than in the partial load range. This non-linear spring characteristic line is needed in order to better adapt the damping behavior of the coupling to the load to be transferred. In the partial load range, where great vibration excitation is to be expected, specifically in the case of ship drives, greater damping is required than in the rated load range.

A shaft coupling having a non-linear spring characteristic line is known from DE 195 37 662 A1. This shaft coupling works with elastomer bodies having different elasticity, which roll on running surfaces and are increasingly compressed as the torsion angle increases. The disadvantage of this coupling is the comparatively great construction space, and the mass moment of inertia that changes over the deformation path. Because of the great change in shape and the change in position of the elastomer bodies under a load, the mass distribution within the coupling changes, and with that, its moment of inertia changes. This makes designing the drive train with regard to its torsional vibration behavior more difficult.

A shaft coupling known from DE 197 03 936 A1, in contrast, has a smaller construction and has an almost constant mass moment of inertia. However, the spring characteristic line of this coupling is almost linear.

From the document cited initially, DE 1 167 661 B, different shaft couplings of the same type are known, in which the transfer of force from the drive flange to the power take-off flange takes place by way of two elastomer bodies that are placed one behind the other. In this connection, the spring stiffness of the first elastomer body is less than that of the second elastomer body. The angle of rotation between the intermediate member and the drive flange is limited by an elastic stop. This has the result that at low drive moments, fully effective vibration damping by the softer elastomer body takes place. At great drive moments, this damping is bridged by the stop, and thereby an overload is avoided. However, the harder second elastomer body then acts, so that even at great drive moments, the elastic resilience to prevent torsion is maintained to its full extent. In the case of the couplings shown, the first, softer elastomer body always surrounds the second, harder one. The flow of force is therefore approximately radial. A disadvantage of these couplings is their large construction space.

The present invention is based on the task of indicating an elastic shaft coupling having a non-linear spring characteristic line, which is characterized by its compact structure and an almost constant mass moment of inertia. A shaft coupling of the type stated initially is therefore supposed to be developed further in such a manner that it has a particularly compact construction, while maintaining its positive properties.

This task is accomplished in that in the case of a shaft coupling of the type stated initially, the second (hard) elastomer body is disposed around the first (soft) elastomer body.

By means of the placement of the elastomer bodies, which is reversed as compared with the state of the art mentioned initially, the flow of force within the coupling does not run radially throughout, but rather is pivoted in loop shape. By means of the pivoting of the flow of force, the radial construction space of the coupling, in other words its diameter, is significantly reduced.

Another fundamental idea of the invention consists in putting stress on the first elastomer body only in the partial load range, and of bridging the first elastomer body, using the rigid stop, once a specific limit moment has been reached—which moment is linked with a corresponding limit torsion angle by way of the spring stiffness. The result is that stress is placed on both elastomer bodies below the limit moment, thereby achieving great elasticity. When the stop is reached, the first elastomer body is no longer deformed, so that only the second elastomer body continues to develop a damping effect with an increasing torque. The progressive spring characteristic line of the overall coupling results from the circumstance that the spring stiffness of the first elastomer body is less than that of the second.

A great advantage of this coupling consists in that its elastomer bodies are fixed in place, and that its shape does not change greatly. Consequently, the mass moment of inertia of the coupling remains almost constant over the torsion path.

The general conditions determined by the other organs of the drive train determine the precise ratio in which the individual spring constants stand to one another, and the torsion angle at which the stop is reached. In this regard, no generally valid dimensioning instructions are possible. However, it has proven to be advantageous that the rigid stop is reached at the rated torque, at the latest, and that the softer first elastomer body is thereby bridged. If the rigid stop is already reached below the rated torque, it is ensured that the coupling balances out load variations during operation solely by means of the second elastomer body. This improves quiet running.

The transition from two elastomer bodies to one elastomer body when the stop is reached can be moderated in that the rigid stop is damped with an elastic cushion. The elastic cushion therefore serves more or less as a third elastomer body, which is switched in parallel with the first elastomer body in the transition range. As soon as the first elastomer body is bridged, the elastic cushion is switched in parallel with the second elastomer body.

A ring-shaped form of the elastic elastomer bodies allows a compact structure of the coupling, on the one hand, and on the other hand brings about a constant mass moment of inertia.

Both of these are further optimized in that the elastomer bodies are disposed concentric to one another. This preferably takes place in such a manner that the second elastomer body surrounds the first elastomer body.

The rigid stop should be provided at least outside of the first elastomer body, so that the force to be supported there is not overly great. Outside of the first elastomer body means that the stop lies on a greater radius relative to the center axis of the shaft coupling than the outermost periphery of the first elastomer body.

In order to further lower the force at the stop, this stop should actually be disposed outside of the second elastomer body. This is particularly advantageous if an elastic cushion is provided on the stop. This cushion can be made to be comparatively light, because of the low force.

In order to structure the shaft coupling in compact manner also in the axial direction, it is recommended to dispose the first elastomer body in such a manner that it extends axially within the second elastomer body. As a result it lies axially and radially within the second elastomer ring.

Of course, the elastomer bodies, in each instance, do not necessarily have to be in one piece. In the interests of guiding cooling air, it is advantageous to compose an elastomer body of multiple segments (that are spaced apart). The individual segments are then switched in parallel with one another and form the elastomer body in their totality.

Rubber or silicon is suitable as a material for the elastomer bodies.

The intermediate member can also be composed of multiple parts. Thus, it is advantageous, in order to facilitate assembly, to structure the intermediate member in two parts and to attach each elastomer body to one part.

Shaft couplings of the type described function independent of the direction of rotation and the direction of stress. If the flow of torque is passed through the coupling in the opposite direction, the drive flange and power take-off flange are essentially interchanged. Consequently, the spring stiffness of the first elastomer body must now be assumed to be greater than that of the second, according to the terminology used here. Consequently, the stop must then also be provided between intermediate member and power take-off flange, so that the elastomer body having the lesser spring stiffness can be bridged. Of course, a structural change in the coupling does not go along with this; the only thing that happens is that the components have different names. The direction of torque flow is a question of how one looks at it, in any case, since according to the fundamental mechanical principle, the torque flows just as much from the engine to the work machine as vice versa.

Figure 2:
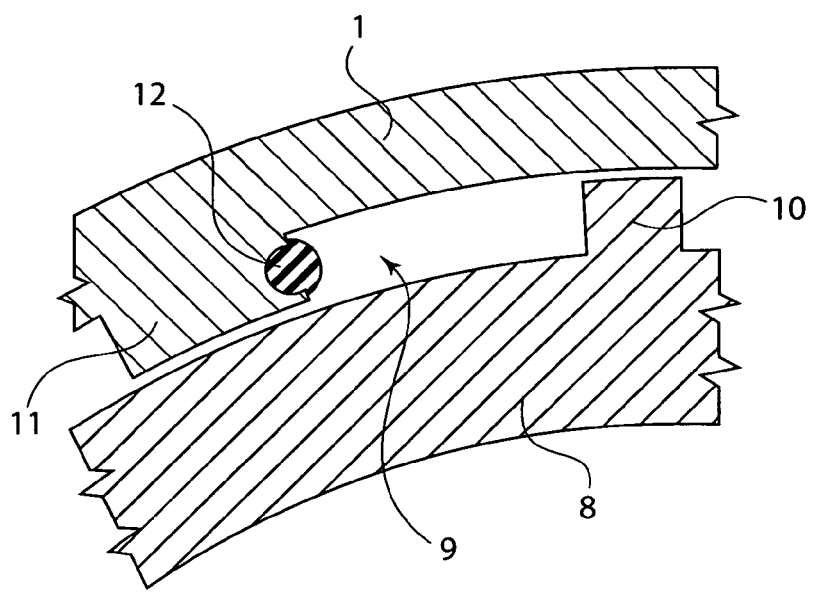
Figure 3:
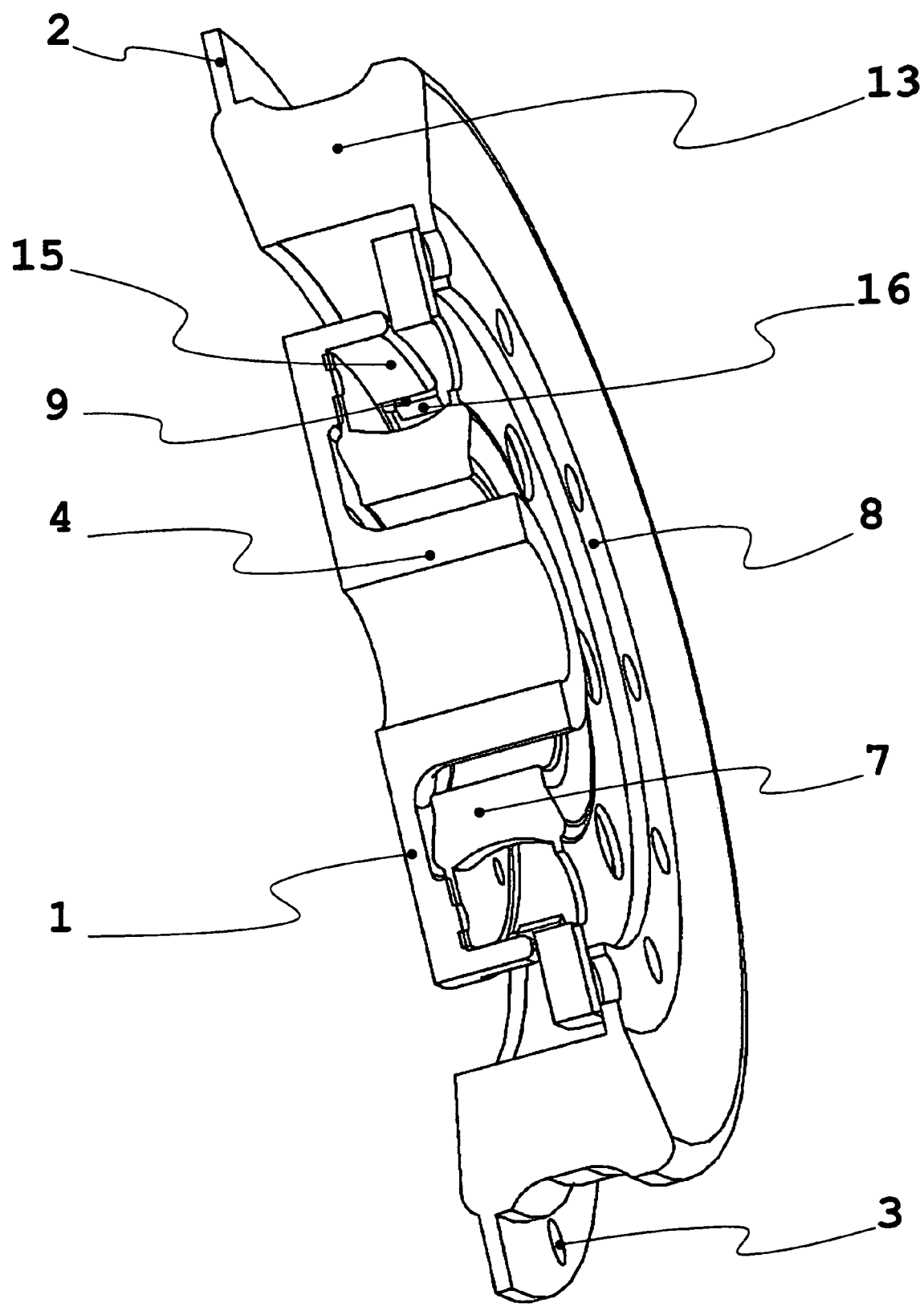
Figure 4:
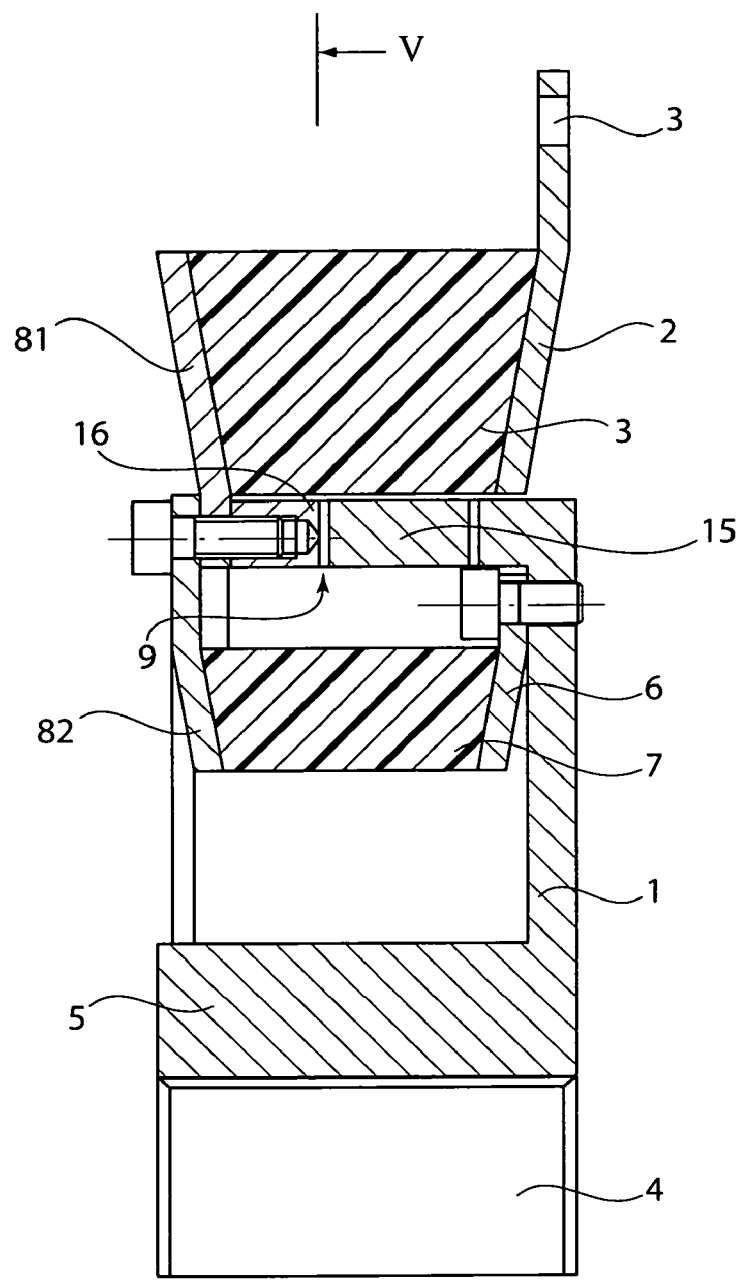
Figure 5:
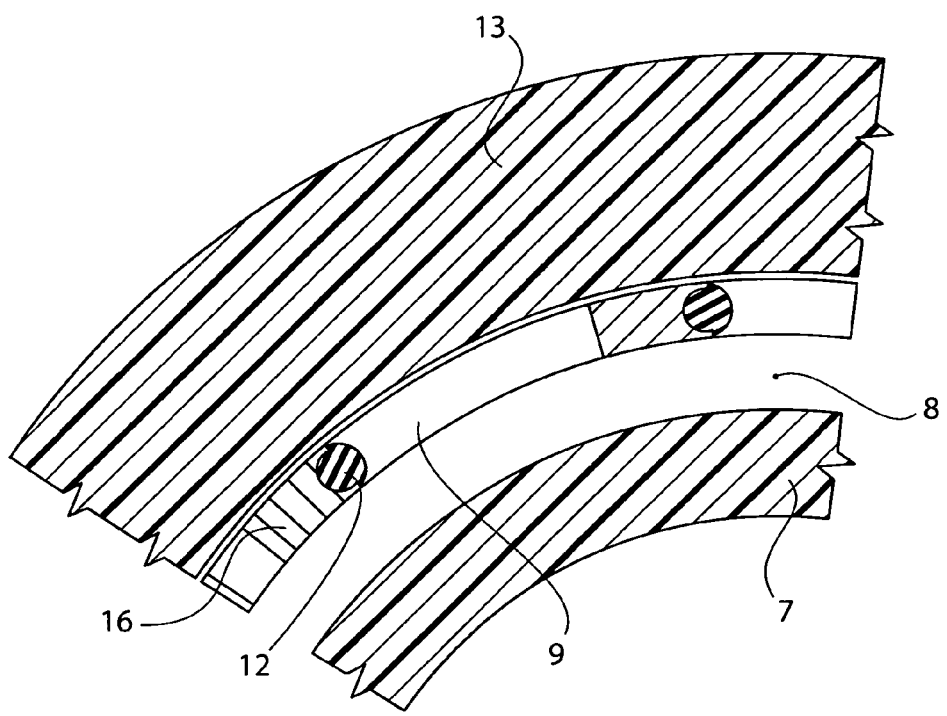
Figure 6:
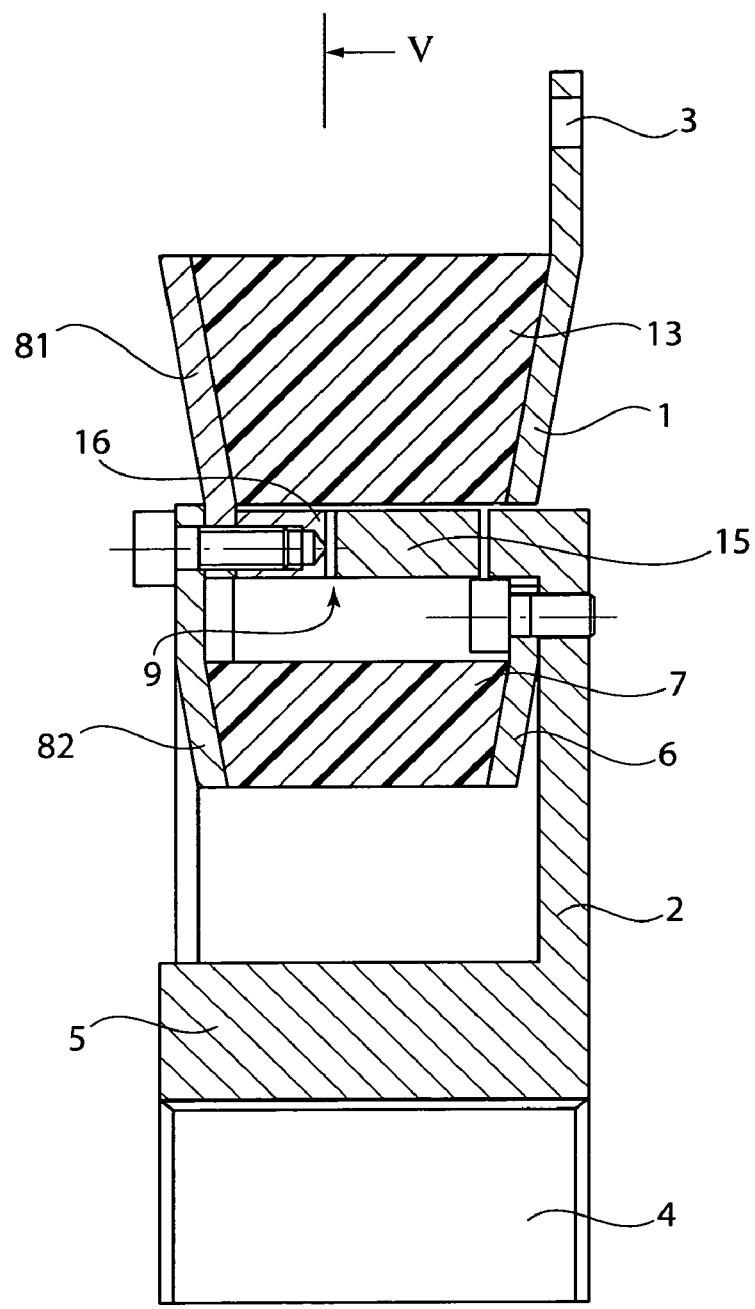

The present invention will now be explained using four exemplary embodiments. For this purpose, the drawing shows:

FIG. 1: first embodiment in longitudinal section;
FIG. 2: stop of the first embodiment in cross-section along the line II-II;
FIG. 3: second embodiment, in longitudinal section, in perspective;
FIG. 4: third embodiment in longitudinal section;
FIG. 5: stop of the third embodiment in cross-section along the line V-V;
FIG. 6: fourth embodiment of the invention.

The torsionally elastic shaft coupling always has a drive flange 1 and a power take-off flange 2, by way of which the shaft coupling is connected with the adjacent machine elements of the drive train. For this purpose, the drive flange 1, in the first exemplary embodiment shown in FIGS. 1 and 2, has a first bolt circle 3, by way of which it is screwed onto the flywheel of an engine, for example. The power take-off flange 2, in contrast, is structured as a hub and comprises a corresponding shaft seat 4, by way of which it can be connected with a shaft.

The torque that flows into the drive flange 1 by way of the bolt circle 3 is passed inward to a collar 5 of the drive flange 1, and from there it is transferred to a connection disk 6. The connection disk 6 is screwed to the collar 5, so as to rotate with it, and consequently, seen in the torsion direction, it is an integral part of the drive flange 1. However, it is also possible to structure the connection disk 6 to be bendable and elastic in the axial direction, so that the shaft coupling can balance out an axial offset. The axial play between drive flange and power take-off flange can then be limited by means of a locking ring.

A first, ring-shaped, elastic elastomer body 7 made of rubber is vulcanized onto the connection disk 6. With its opposite flank, the first elastomer body 7 is vulcanized onto an intermediate member 8. The intermediate member 8 can be twisted relative to the drive flange 1, with shear deformation of the first elastomer body 7.

The torsion angle between intermediate member 8 and drive flange 1 is limited, however, by means of a rigid stop 9. This stop is formed, on the side of the intermediate member 8, by means of at least one projection 10 that projects radially beyond the circumference of the intermediate member 8, which projection runs up against a corresponding projection 11 that projects radially inward on the drive flange 1. The two projections are provided with reference symbols only in the cross-section shown in FIG. 2. Also, an elastic cushion 12 disposed in the projection 11 of the drive flange 1 can be seen only there; it damps the contact of the projections 10, 11. Multiple pairs of projections are provided over the circumference, which make contact at the same time.

Before and also after the stop 9 is reached, the torque is transferred further from the intermediate member 8, by way of a second elastic elastomer body 13, in the direction of the power take-off flange 2. The second elastomer body 13 also consists of rubber and is vulcanized onto the intermediate member 8 with its one flank, and onto a second connection disk 14 with its other flank; the latter disk in turn is firmly screwed onto the power take-off flange 2. The connection disk 14 merely serves to simplify assembly.

The embodiment shown in FIGS. 1 and 2 is characterized by a particularly compact structure, which is brought about by means of the ring-shaped elastomer bodies 7, 13 that lie axially and radially one inside the other: The flow of force runs pivoted in a loop, from the outer bolt circle 3 inward to the collar 5, and afterwards, by way of the first elastomer body 7, the intermediate member 8, and the second elastomer body 13, back to the outside. Once it has arrived there, the flow of force turns around once again, and runs back inward, in the direction of the shaft seat 4, by way of the connection disk 14 and the power take-off flange 2.

The greater spring stiffness of the second elastomer body 13 is achieved by means of its greater rubber mass. Alternatively, different rubber materials, or rubber on the one hand, and silicone on the other hand, can be provided.

In FIG. 3, a second embodiment of the shaft coupling according to the invention is shown. FIGS. 4 to 6 show a modification that is different in design, but not fundamentally different.

The embodiments shown in FIGS. 3 to 5 differ from the embodiment from FIGS. 1 and 2 as explained above fundamentally in that the stop 9 is disposed between the two elastomer bodies 7, 13. Also, the stop 9 is not formed by means of projections that engage radially into one another, but rather by means of a plurality of claws 15, 16 that extend in the axial direction and undercut one another in the circumference direction. Finally, the drive flange 1 lies essentially within the power take-off flange 2. Here, the shaft seat 4 is on the drive flange 1, on the drive side; the power take-off flange 2 is provided with the bolt circle 3. Here, the intermediate member 8 is structured in two parts. The first elastomer body 7 is vulcanized onto the first part 82 of the intermediate member 8, the second elastomer body 13 is vulcanized onto the second part 81. The two parts 81, 82 of the intermediate member are screwed together.

The couplings shown can also be used with reverse torque flow, according to the invention. From this, it follows that the drive flange and power take-off flange can be functionally interchanged, without changing the shape of the drive flange and the power take-off flange and of the elastomer bodies; the stop is then situated between intermediate member and power take-off flange. FIG. 6 shows the identical shaft coupling from FIG. 4, but with the torque flow reversed, from the bolt circle 3 to the shaft seat 4. This results in a change in the functional designations of the components, which has its effect exclusively in a switch in their reference numbers.

The invention claimed is:

1. A torsionally elastic shaft coupling, comprising:
a) a drive flange and a power take-off flange, for connecting the shaft coupling with adjacent machine elements,
b) two elastic elastomer bodies switched in series, and
c) an intermediate member that is connected with the drive flange by way of a first elastomer body and with the power take-off flange by way of a second elastomer body, such that the torque is transferred from the drive flange to the intermediate member by way of the first elastomer body, and from there, to the power take-off flange, by way of the second elastomer body,
wherein a spring stiffness of the first elastomer body is less than a spring stiffness of the second elastomer body,
wherein a torsion angle between drive flange and intermediate member is limited by a rigid stop disposed radially outside of the first elastomer body and radially outside of the second elastomer body,
wherein the elastic elastomer bodies are configured essentially in ring shape and disposed concentrically, and
wherein the second elastomer body surrounds the first elastomer body.

2. The shaft coupling according to claim 1, wherein the intermediate member is structured in two parts, and wherein the elastomer bodies are each affixed to one part of the intermediate member.

3. A torsionally elastic shaft coupling comprising:
a) a drive flange and a power take-off flange, for connecting the shaft coupling with adjacent machine elements,
b) two elastic elastomer bodies switched in series, and
c) an intermediate member that is connected with the drive flange by way of a first elastomer body and with the power take-off flange by way of a second elastomer body, such that the torque is transferred from the drive flange to the intermediate member by way of the first elastomer body, and from there, to the power take-off flange, by way of the second elastomer body,
wherein a spring stiffness of the first elastomer body is greater than the spring stiffness of the second elastomer body,
wherein a torsion angle between power take-off flange and intermediate member is limited by a rigid stop disposed radially outside the first elastomer body and radially outside of the second elastomer body,
wherein the elastic elastomer bodies are configured essentially in ring shape and disposed concentrically, and
wherein the first elastomer body surrounds the second elastomer body.

* * * * *

UNITED STATES PATENT AND TRADEMARK OFFICE
CERTIFICATE OF CORRECTION

PATENT NO. : 8,357,051 B2  Page 1 of 1
APPLICATION NO. : 12/311264
DATED : January 22, 2013
INVENTOR(S) : Mehlan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 620 days.

Signed and Sealed this

First Day of September, 2015

Michelle K. Lee
*Director of the United States Patent and Trademark Office*